United States Patent
Kawakita et al.

(10) Patent No.: US 11,486,843 B2
(45) Date of Patent: Nov. 1, 2022

(54) DRYNESS/WETNESS RESPONSIVE SENSOR

(71) Applicant: NATIONAL INSTITUTE FOR MATERIALS SCIENCE, Ibaraki (JP)

(72) Inventors: Jin Kawakita, Ibaraki (JP); Akihiko Ohi, Ibaraki (JP); Tomoko Ohki, Ibaraki (JP); Naoki Ikeda, Ibaraki (JP); Toshihide Nabatame, Ibaraki (JP); Toyohiro Chikyo, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 335 days.

(21) Appl. No.: 16/640,421

(22) PCT Filed: Aug. 23, 2018

(86) PCT No.: PCT/JP2018/031082
§ 371 (c)(1),
(2) Date: Feb. 20, 2020

(87) PCT Pub. No.: WO2019/044640
PCT Pub. Date: Mar. 7, 2019

(65) Prior Publication Data
US 2020/0249185 A1    Aug. 6, 2020

(30) Foreign Application Priority Data
Sep. 1, 2017   (JP) .............................. JP2017-168167

(51) Int. Cl.
*G01N 27/04* (2006.01)
(52) U.S. Cl.
CPC ................................ *G01N 27/048* (2013.01)

(58) Field of Classification Search
CPC . G01N 27/00–04; G01N 27/048; G01N 27/12
See application file for complete search history.

(56) References Cited

U.S. PATENT DOCUMENTS 9,347,905 B2 *   5/2016   Jiao ......................... B32B 15/01
9,618,465 B2 *   4/2017   Kocanda ............. G01N 33/005
(Continued)

FOREIGN PATENT DOCUMENTS

EP    0313264 B1 * 11/1991 .............. G01M 3/04
JP    62-66150         3/1987
(Continued)

OTHER PUBLICATIONS

Notice of Reasons for Refusal dated Oct. 6, 2020 in corresponding Japanese Patent Application No. 2019-539421, with English-language translation.

(Continued)

*Primary Examiner* — Nguyen Q. Ha
(74) *Attorney, Agent, or Firm* — Wenderoth, Lind & Ponack, L.L.P.

(57) ABSTRACT

The present invention is to provide a small-sized dryness/wetness responsive sensor that detects a galvanic current with a high sensitivity as a principle of operation. According to one embodiment of the present invention, a dryness/wetness responsive sensor comprises a thin wire made of a first metal and a thin wire made of a second metal, the second metal is different from the first metal, the thin wire of the first metal and the thin wire of the second metal are disposed in juxtaposition with each other on an insulating substrate, and a surface state of a part between the thin wire of the first metal and the thin wire of the second metal is hydrophilic or hydrophobic.

10 Claims, 10 Drawing Sheets

(56) References Cited

U.S. PATENT DOCUMENTS

| | | |
|---|---|---|
| 2011/0033764 A1 | 2/2011 | Wang et al. |
| 2015/0129538 A1 | 5/2015 | Grange et al. |
| 2017/0167995 A1 | 6/2017 | Kawakita et al. |

FOREIGN PATENT DOCUMENTS

| | | |
|---|---|---|
| JP | 2003-222602 | 8/2003 |
| WO | 2014/150093 | 9/2014 |
| WO | 2016/013544 | 1/2016 |
| WO | 2017/213118 | 12/2017 |

OTHER PUBLICATIONS

Matienzo et al., "Polymer oxidation downstream from oxygen microwave plasmas", Polymer Degradation and Stability, 1992, vol. 35, pp. 181-192.

Toray Co., Ltd., "DuPont(TM) Kapton(R) electric insulating materials", [online], 2021, [search on Jan. 26, Reiwa 3(2021)], Internet <URL: https://www.td-net.co.jp/kapton/showcase/sho_kp030.html>, with partial English translation and cited in CD.

Urushitani Masori "Experience from drawing operation using CAD tools to order! Design and production of printed circuit boards", transistor technology, 2007, vol. 44, No. 6, p. 102-103, with partial English translation and cited in CD.

Notice of Reasons for Refusal dated Feb. 16, 2021 in corresponding Japanese Patent Application No. 2019-539421, with English translation.

Notice of reason for Refusal dated Jan. 18, 2022, in corresponding Japanese patent application No. 2019-539421 with English translation.

Notice of Reasons for Refusal dated Oct. 5, 2021 in corresponding Japanese Patent Application No. 2019-539421, with English-language translation.

Extended European Search Report dated Apr. 7, 2021 in corresponding European Patent Application No. 18851532.4.

Williams et al., "Wetting of thin layers of $SiO_2$ by water", Applied Physics Letters, Nov. 15, 1974, vol. 25, No. 10, pp. 531-532.

Office Action dated Sep. 3, 2021 in corresponding European Patent Application No. 18851532.4.

International Search Report (ISR) dated Nov. 13, 2018 in International (PCT) Application No. PCT/JP2018/031082.

Non-official translation "Image forming apparatus", Published technical information of Japan Institute of Invention and Innovation, Published technique No. 2004-500855, Japan Institute of Invention and Innovation, Feb. 10, 2004.

Tatsuya Ando et al., "Improved sensitivity and accuracy of sensors that detect minute water droplets", Abstracts of Lecture Meeting, The Surface Finishing Society of Japan, vol. 136th, pp. 120-121, Sep. 4, 2017, together with machine translation & cited in CA.

F. Mansfeld et al., "Electrochemical Monitoring of Atmospheric Corrosion Phenomena", Corrosion Science, vol. 16, pp. 111-122, 1976, cited in the specification.

Peter Norberg et al., "Surface Moisture and Time of Wetness Measurements", Service Life Prediction Methodology and Metrologies, ACS Symposium Series 805, Jonathan W. Martin and David R. Bauer, Eds., American Chemical Society, pp. 23-36, 2002, cited in the specification.

Tadashi Shinohara et al., "Evaluation of Corrosivity of Atmosphere by ACM Type Corrosion Sensor", Zairyo-to-Kankyo, vol. 54, pp. 375-382, 2005, together with machine translation & cited in the specification.

\* cited by examiner (a)

(b)

(a)

(b)

(c)

DRYNESS/WETNESS RESPONSIVE SENSOR

TECHNICAL FIELD

The present invention relates to a dryness/wetness responsive sensor, and more specifically, relates to a small-sized dryness/wetness responsive sensor having high sensitivity and high stability in detection of a fine liquid droplet.

BACKGROUND ART

As dryness/wetness responsive sensors, humidity sensors are known which detect humidity based on a change in the electric resistance value (impedance) or electrostatic capacitance of a sensor element (dryness/wetness responsive part). In a humidity sensor of an electric resistance type, as a dryness/wetness responsive material of a sensor element, a polymer, ceramics, or the like is generally used, and since the material is low-cost and the structure is simple, a low cost can be achieved through mass production. However, if the humidity sensor of the electric resistance type gets wet with water, the sensor element will break down, and thus, the humidity sensor of the electric resistance type cannot be used under a condition in which dew condensation may occur. For this reason, the measurement humidity range is restricted to the range of 10 to 90% RH, and it is difficult to use the humidity sensor of the electric resistance type in a low humidity environment of 10% RH or less and in a high humidity environment of over 90% RH. In addition, the humidity sensor of the electric resistance type has a large aging variation, and, since it also has high temperature dependency in many cases, a temperature correction is required. Furthermore, the humidity sensor of the electric resistance type also has problems of large variation in precision (about ±5 to 15% RH) and a long response time (30 seconds to several minutes or even more).

In a humidity sensor of an electrostatic capacitance type, a polymer membrane is generally used as the dryness/wetness responsive material of the sensor element. Accordingly, the humidity sensor of the electrostatic capacitance type has a higher response speed (normally, about several seconds to ten seconds) and higher precision/reproducibility/reliability than the electric resistance type. Though its typical measurement humidity range is 0 to 100% RH, there are occasions when the sensor element is broken down under a dew condensation condition. In addition, the humidity sensor of the electrostatic capacitance type also has a problem of higher production cost than that of the humidity sensor of the electric resistance type.

Furthermore, a humidity sensor of both of the electric resistance type and the electrostatic capacitance type requires an external drive power supply for driving the sensor. In addition, a conventional humidity sensor cannot detect the size of water droplets attached to the surface of the sensor element due to its sensor structure or its detection principle.

Recently, a dryness/wetness responsive sensor based on galvanic action has been developed.

This dryness/wetness responsive sensor is a sensor having a structure in which a large number of wirings using two different kinds of metals are arranged with a minute spacing therebetween, which exhibits a dryness/wetness responsiveness by detecting a current flowing between the metal wirings when the minute spacing is touched with a water droplet. This dryness/wetness responsive sensor is disclosed in, for example, Non Patent Literatures 1 to 3. Further, a sensor that is obtained by downsizing the dryness/wetness responsive sensor, and by making the response faster is disclosed in Patent Literature 1.

CITATION LIST

Patent Literature

Patent Literature 1: WO 2016/13544 A1

Non Patent Literature

Non Patent Literature 1: Corrosion Science, Vol. 16, pp. 111 to 122 (1976)
Non Patent Literature 2: Service Life Prediction Methodology and Metrologies, ACS Symposium Series 805, Eds., American Chemical Society, pp. 23 to 36 (2002)
Non Patent Literature 3: Tadashi Shinohara, et al., Zairyo-to-Kankyo, Volume 54, Issue 8, Pages 375-382 (2005)

SUMMARY OF INVENTION

Technical Problem

An object of the present invention is to improve the detection sensitivity in a small-sized dryness/wetness responsive sensor that detects a galvanic current as a principle of operation.

Solution to Problem

The constitutions of the present invention are described in the below.
(Constitution 1)
A dryness/wetness responsive sensor comprising
a thin wire of a first metal,
a thin wire of a second metal, the second metal being different from the first metal,
wherein the thin wire of the first metal and the thin wire of the second metal are disposed in juxtaposition with each other on an insulating substrate, and
wherein a surface state of a part between the thin wire of the first metal and the thin wire of the second metal is hydrophilic or hydrophobic.
(Constitution 2)
The dryness/wetness responsive sensor described in constitution 1, wherein an insulating film is formed in a part between the thin wire of the first metal and the thin wire of the second metal.
(Constitution 3)
The dryness/wetness responsive sensor described in constitution 2, wherein the thin wire of the first metal, the thin wire of the second metal, and the insulating film are formed on the insulating substrate, and wherein the thin wire of the first metal, the thin wire of the second metal, and the insulating film are of uniform height.
(Constitution 4)
The dryness/wetness responsive sensor described in any one of constitutions 1 to 3, wherein a contact angle of water on a surface of a part between the thin wire of the first metal and the thin wire of the second metal or on a surface of the insulating film is 0° or more and 30° or less.
(Constitution 5)
The dryness/wetness responsive sensor described in any one of constitutions 1 to 3, wherein a contact angle of water on a surface of a part between the thin wire of the first metal and the thin wire of the second metal or on a surface of the insulating film is 0° or more and 15° or less.

(Constitution 6)

The dryness/wetness responsive sensor described in any one of constitutions 1 to 3, wherein a contact angle of water on a surface of a part between the thin wire of the first metal and the thin wire of the second metal or on a surface of the insulating film is 60° or more and 180° or less.

(Constitution 7)

The dryness/wetness responsive sensor described in any one of constitutions 1 to 3, wherein a contact angle of water on a surface of a part between the thin wire of the first metal and the thin wire of the second metal or on a surface of the insulating film is 65° or more and 180° or less.

(Constitution 8)

The dryness/wetness responsive sensor described in any one of constitutions 1 to 7, wherein the first metal is selected from a group consisting of gold, platinum, silver, titanium, an alloy thereof, and carbon.

(Constitution 9)

The dryness/wetness responsive sensor described in any one of constitutions 1 to 8, wherein the second metal is selected from a group consisting of silver, copper, iron, zinc, nickel, cobalt, aluminum, tin, chromium, molybdenum, manganese, magnesium, and an alloy thereof.

(Constitution 10)

The dryness/wetness responsive sensor described in any one of constitutions 1 to 9, wherein the spacing between the thin wire of the first metal and the thin wire of the second metal is in a range of 5 nm or more and 20000 nm or less.

(Constitution 11)

The dryness/wetness responsive sensor described in any one of constitutions 1 to 10, comprising a plurality of at least one selected from the group consisting of the thin wire of the first metal and the thin wire of the second metal, wherein the thin wire of the first metal extends from a first side towards a second side that is opposite to the first side and the thin wire of the second metal extends from the second side towards the first side such that the thin wire of the first metal and the thin wire of the second metal are arranged in parallel with and approached each other.

Advantageous Effects of Invention

According to the present invention, a small-sized dryness/wetness responsive sensor is provided that has a simple structure, does not necessarily need a sensor driving power, and responds quickly with a high sensitivity. Further, the dryness/wetness responsive sensor according to the present invention also functions as a water droplet detection sensor having the above characteristics.

DESCRIPTION OF EMBODIMENTS

In the dryness/wetness responsive sensor according to the present invention, a dry/wet state is monitored by detecting water droplets generated in response to the dry/wet state. Therefore, the dryness/wetness responsive sensor according to the present invention can be used even under the condition of dew condensation, and can also be used as a water droplet sensor (a conductive liquid droplet sensor in a broad sense).

Figure 1:
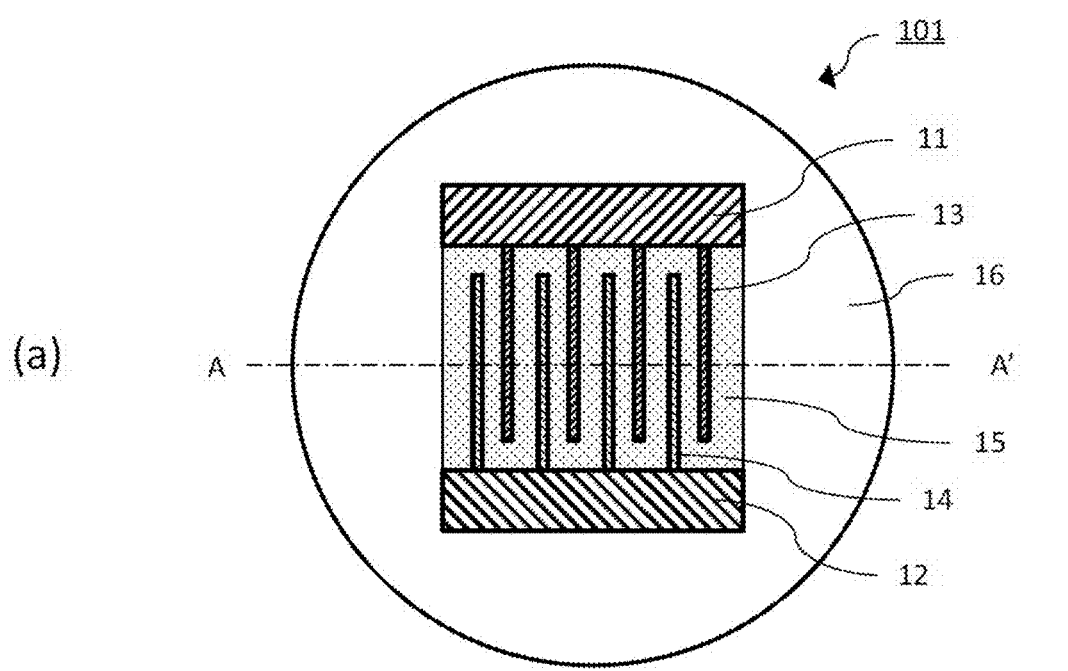
FIGS. 1(a) and 1(b) are conceptual diagrams for illustrating a structure of a dryness/wetness responsive sensor.
Figure 1:
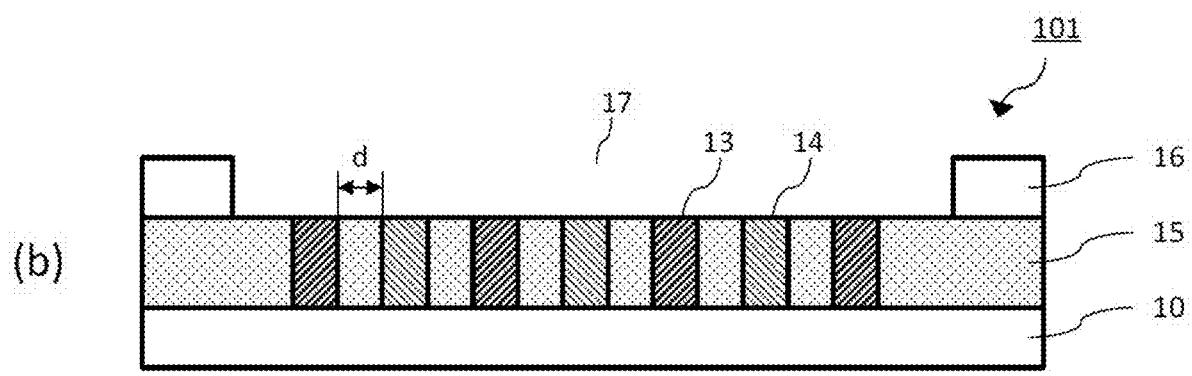

The structure of the dryness/wetness responsive sensor according to the present invention will be described with reference to FIGS. 1(a) and 1(b). FIGS. 1(a) and 1(b) are conceptual diagrams the illustrate the structure of the dryness/wetness responsive sensor. FIG. 1(a) is a plan view, and FIG. 1(b) is a sectional view of a part along the line A-A' of FIG. 1(a).

The dryness/wetness responsive sensor 101 according to the present invention has a structure in which electrode thin wires (first thin wires) 13 made of a first metal and electrode thin wires (second thin wires) 14 made of a second metal. The second metal is different from the first metal, and the first thin wire 13 and the second thin wire 14 are disposed in juxtaposition with and approached each other in the lateral direction on an insulating substrate 10. Further, a surface state of a part between the first thin wire 13 and the second thin wire 14 is maintained in a hydrophilic or hydrophobic state.

Figure 2:
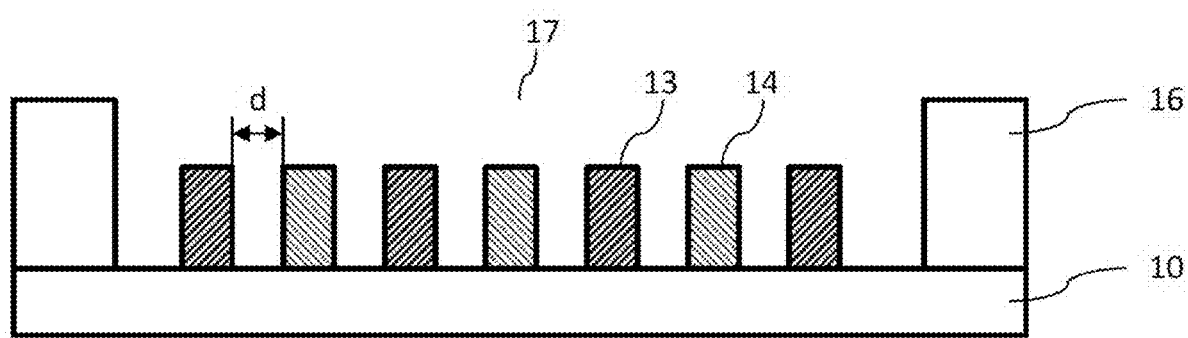
FIG. 2 is a conceptual diagram for illustrating a cross-sectional structure of a dryness/wetness responsive sensor.

As a method for maintaining the surface state of a part between the first thin wire 13 and the second thin wire 14 in a hydrophilic or hydrophobic state, there are, for example, as illustrated in FIGS. 1(a) and 1(b), a method in which a hydrophilic or hydrophobic insulating film 15 is formed in a part between the first thin wire 13 and the second thin wire 14, and as illustrated in FIG. 2, a method in which a part between the first thin wire 13 and the second thin wire 14 is taken to be a space, and an exposed surface of an insulating substrate 10 or/and exposed surfaces on the sides of the first thin wire 13 and the second thin wire 14 are subjected to surface treatment to make the surfaces hydrophilic or hydrophobic. The details will be described later.

As the insulating substrate 10, a silicon substrate or the like with a silicon oxide film ($SiO_2$ film) on its surface can be preferably used, but the insulating substrate 10 is not limited to the silicon substrate, and a variety of insulating materials, for example, a plastic such as polycarbonate, rubber, and others can also be used. Further, as the substrate main body, even if the substrate is a conductor made of a metal or the like, when the substrate becomes to have insulation properties as viewed from electrodes by forming an insulating coating, covering, or the like on a surface of the substrate, the substrate is also included in the category of "insulating substrate" in the present application.

The first thin wire 13 is connected to a first electrode 11, the second thin wire 14 is connected to a second electrode 12, and the first electrode 11 and the second electrode 12 are connected to a signal output terminal via electrical wirings (not illustrated in the drawing) connected to the first and second electrodes. An amplifier may be connected to the first electrode 11 and the second electrode 12 to amplify a galvanic current flowing due to the presence of a liquid droplet.

When the first metal and the second metal having an electrochemical potential different from that of the first metal are connected by a conductive liquid droplet such as a water droplet, a galvanic current flows. Water has low conductivity and is insulative in a state of ultrapure water, however, if a minute amount of electrolytic component is contained by hydrogen ions and hydroxide ions, which are present at least at $10^{-7}$ mol/L, respectively, a contamination, or the like, a measurable galvanic current flows.

Further, in a case where a semiconductor such as titanium oxide is used as the second thin wire 14, a difference in electrochemical potential is generated due to the photoelectric effect when light falls on the semiconductor, and a current flows between the first thin wire 13 and the second thin wire 14 which are connected by a conductive liquid.

In this structure of the dryness/wetness responsive sensor according to the present invention, by using thin wires as electrode wirings, it is possible to increase a length of the portions of both the electrodes facing each other with approaching each other with respect to the area of the sensor part. Thus, it is possible to increase in the capacity of the cell, in other words, it is possible to increase in the galvanic current to be taken out.

As a configuration for increasing a length (hereinafter, referred to as an approaching distance) of approached portions between thin wires (electrodes) by arranging such thin wires in parallel with and approached each other, for example, a comb structure or a double spirally-wound structure may be employed. In addition, a structure itself for increasing an approaching distance between two electrodes inside a predetermined plane area as possibly as can be is well known in the field of a semiconductor device and the like, and thus, such a structure may be employed as is necessary. In the present invention, "juxtaposing electrodes on a substrate" is not for specifying mutual directions of a plurality of thin wires (electrodes) placed on the substrate but represents that the thin wires (electrodes) are arranged on a same plane of the substrate with being separate from each other.

In a case where the first thin wire 13 is used as a cathode, examples of the material for the first thin wire 13 include gold (Au), platinum (Pt), silver (Ag), titanium (Ti), an alloy thereof, and carbon (C) and an allotrope thereof. In a case where the second thin wire 14 is used as an anode, examples of the material for the second thin wire 14 include silver (Ag), copper (Cu), iron (Fe), zinc (Zn), nickel (Ni), cobalt (Co), aluminum (Al), tin (Sn), chromium (Cr), molybdenum (Mo), manganese (Mn), magnesium (Mg), and an alloy thereof. It should be noted that, in a case where silver and an alloy thereof are used as the first thin wire 13, a material other than silver and an alloy thereof is used as the material for the second thin wire 14.

The sensor output (current) depends on the combination of metal materials for the thin wires. For example, when the combinations of silver/iron and gold/silver are compared with each other, the current value to be obtained in the combination of silver/iron is larger than that in the combination of gold/silver because the combination of silver/iron has a corrosion rate per area larger than that in the combination of gold/silver. On the other hand, in the combination of gold/silver, the service life is longer because the combination of gold/silver has smaller consumption of the electrodes. In this regard, silver has an effect of preventing the generation of mold on a dryness/wetness responsive sensor 101, and therefore, it is preferable to use silver as the first thin wire or the second thin wire. Further, in a case where the first electrode 11 is made of the same material as that of the first thin wire 13, and the second electrode 12 is made of the same material as that of the second thin wire 14, the production process of the dryness/wetness responsive sensor 101 is simplified, and therefore, this is preferable.

In the dryness/wetness responsive sensor 101, when a galvanic current flows repeatedly, the metal of the anode electrode which is the second thin wire 14 is ionized, and accordingly, the anode electrode (second thin wire 14) is gradually consumed. In addition, in a case where a long-term use under an environment having high humidity and a large salt damage is assumed, particularly, in a dryness/wetness responsive sensor 101 having thin electrodes for increasing the laying density, there is a possibility that the inter-thin wire distance "d" (inter-electrode distance) is gradually increased or the thin wire is cut out in accordance with the consumption of the anode electrode.

In order to address these problems with the laying density of the thin wires maintained, for example, the thickness of the anode electrode may be increased, or the width of the anode electrode may be increased instead of the width of the cathode electrode (first thin wire 13) may be decreased. In a case where the inter-thin wire distance "d" is very short, the influence of a slight increase in the inter-thin wire distance according to the consumption of the anode electrode on a result of the measurement increases. In a case where such an influence matters, for example, by using a principle that the consumption of the metal of the anode electrode is in proportion to the time integral of a galvanic current, a countermeasure of performing compensation calculation for the result of the measurement as the whole measurement system may be established.

As a method for maintaining the surface state of a part between the first thin wire 13 and the second thin wire 14 in a hydrophilic or hydrophobic state, there are:

(1) a method in which a hydrophilic or hydrophobic substrate is used as an insulating substrate 10;

(2) a method in which a hydrophilic or hydrophobic substrate is used as an insulating substrate 10, and further side surfaces of a first thin wire 13 and a second thin wire 14 are subjected to hydrophilic or hydrophobic surface treatment; and (3) a method in which a hydrophilic or hydrophobic insulating film 15 is formed in a part between a first thin wire 13 and a second thin wire 14.

In method (1), as the hydrophilic insulating substrate, a substrate in which at least one or more selected from the group of at least a hydroxyl group, an oxyalkylene group, an amino group, a carboxyl group, and a sulfonic acid group are formed on a surface of an insulating substrate can be mentioned.

Specifically, a substrate obtained by performing an oxygen plasma treatment on a glass such as synthetic quartz glass or soda-lime glass, or on a silicon substrate in which a $SiO_2$ oxide film is formed on a Si wafer can be mentioned.

Further, a substrate in which a resin coating film is deposited on a glass substrate, a Si wafer substrate, or a base of acryl, polystyrene (PS), polypropylene (PP), polyethylene terephthalate (PET), polycarbonate (PC) or the like can be mentioned. In this regard, the resin includes an acrylic resin, a methacrylate resin, a novolak resin, a polyester resin, a polyamide resin, a polyimide resin, a polyamideimide resin, and a silicone resin, and the resin has one or more groups selected from the group of a polyoxyalkylene group, an amino group, a carboxyl group, a hydroxyl group, and a sulfonic acid group.

In method (1), as the hydrophobic insulating substrate, a substrate in which at least one or more selected from the group of at least a fluorinated hydrocarbon group, a silyl group, a siloxane group, an alkyl group having 6 or more and 20 or less carbon atoms, and an aromatic hydrocarbon group having 10 or more and 20 or less carbon atoms are formed on a surface of an insulating substrate can be mentioned.

Specifically, a substrate made of a material selected from the group of polytetrafluoroethylene(PTFE), a tetrafluoroethylene-perfluoroalkyl vinyl ether copolymer (PFA), a tetrafluoroethylene-hexafluoropropylene copolymer (FEP), and a tetrafluoroethylene-ethylene copolymer (ETFE); a substrate whose surface is coated with a material selected from the above group; a substrate obtained by modifying a surface of a glass such as synthetic quartz glass or soda-lime glass, or a surface of a silicon substrate in which a $SiO_2$ oxide film is formed on a Si wafer, with a silyl group such as hexamethyldisilazane (HMDS) or a fluorinated hydrocarbon group; or the like can be mentioned.

Further, a substrate in which a resin coating film is deposited on a glass substrate, a Si wafer substrate, or a base of acryl, PS, PP, PET, PC or the like can be mentioned. In this regard, the resin includes an acrylic resin, a methacrylate resin, a novolak resin, a polyester resin, a polyamide resin, a polyimide resin, a polyamideimide resin, and a silicone resin, and the resin has one or more groups selected from the group of a fluorinated hydrocarbon group, a silyl group, a siloxane group, an alkyl group having 6 or more and 20 or less carbon atoms, and an aromatic hydrocarbon group having 10 or more and 20 or less carbon atoms.

In method (2), as the method for making the side surfaces of the thin wire hydrophilic, there is, for example, a method in which an isotropic oxygen plasma treatment is performed on a thin wire, and then an oxide film formed on an upper surface of the thin wire is anisotropically removed by using reducing gas.

In method (2), as the method for making the side surfaces of the thin wire hydrophobic, there is, for example, a method in which an isotropic oxygen plasma treatment is performed on a thin wire to form an oxide film; next, a surface of the oxide film is modified by using at least one or more selected from the group of a fluorinated hydrocarbon group, a silyl group, a siloxane group, an alkyl group having 6 or more and 20 or less carbon atoms, and an aromatic hydrocarbon group having 10 or more and 20 or less carbon atoms; and then the oxide film formed on an upper surface of the thin wire is anisotropically removed by using reducing gas.

In method (3), as the hydrophilic insulating film, an insulating film containing at least one or more selected from the group of a hydroxyl group, an oxyalkylene group, an amino group, a carboxyl group, and a sulfonic acid group; and a film obtained by modifying a surface of an insulating film such as $SiO_2$, an acrylic resin, a methacrylate resin, a novolak resin, a polyester resin, a polyamide resin, a polyimide resin, a polyamideimide resin, or a silicone resin, with at least one or more selected from the group of a hydroxyl group, an oxyalkylene group, an amino group, a carboxyl group, and a sulfonic acid group can be mentioned.

Specifically, a coating film formed by coating GL2000 (manufactured by Gluon Lab); a film obtained by performing an oxygen plasma treatment on a silicon oxide film made by chemical vapor deposition (CVD), or a coating film formed by coating spin on glass (SOG), an acrylic resin, a polyimide resin or the like, to form a hydroxyl group on a surface of the film can be mentioned.

In method (3), as the hydrophobic insulating film, an insulating film containing at least one or more selected from the group of a fluorinated hydrocarbon group, a silyl group, and a siloxane group; and a film obtained by modifying a surface of an insulating film such as $SiO_2$, a polymethyl methacrylate resin (PMMA), an acrylic resin, a novolak resin, a polyester resin, a polyamide resin, a polyimide resin, a polyamideimide resin, or a silicone resin, with at least one or more selected from the group of a fluorinated hydrocarbon group, a silyl group, and a siloxane group can be mentioned.

Specifically, a coating film formed by coating a silicone resin; a film obtained by modifying a surface of a silicon oxide film made by chemical vapor deposition (CVD), or a surface of a coating film formed by coating spin on glass (SOG), with HMDS can be mentioned.

In method (3), as the method for forming an insulating film, a method using a coating process, a CVD method, or a physical vapor deposition (PVD) method such as sputtering may be adopted. In a case where insulating films are formed on a first thin wire 13 and a second thin wire 14, the insulating films on the thin wires are removed by lithography and etching, etchback, polishing, chemical-mechanical polishing (CMP) or the like.

In a case where a first thin wire 13, a second thin wire 14, and an insulating film 15 are of uniform height, a water droplet generated due to a dry/wet state in an environment is hardly accumulated, and the transpiration and drying of a water droplet once generated are faster than the transpiration and drying in a case where there is a depression (in a case where there is a space between the first thin wire 13 and the second thin wire 14). For this reason, a dryness/wetness responsive sensor having a structure in which the heights are uniform is characterized by having improved responsiveness to a given environment. Further, if there is a depression (if there is a space between the first thin wire 13 and the second thin wire 14), foreign matters or contaminants tend to be accumulated in the depression (the space), and a problem that the stability with time becomes poor is easily occurred, however, in a dryness/wetness responsive sensor having a structure in which a first thin wire 13, a second thin wire 14, and an insulating film 15 are of uniform height, the problem as described above is hardly occurred. In relation to method (3), in the method of using an insulating film, a first thin wire 13, a second thin wire 14, and an insulating film 15 in a part between the thin wires can be of uniform height, and therefore, from this point of view, the method is preferable. In this regard, in the present invention, the expression "heights" of a first thin wire, a second thin wire, and an insulating film are referred to as the heights from an insulating substrate to respective upper surfaces of the first thin wire, the second thin wire, and the insulating film. Further, the expression "a first thin wire, a second thin wire, and an insulating film are of uniform height" means that an absolute value of the difference between the average value of the height of the first thin wire and the height of the second thin wire, and the height of the insulating film is within the range of 0 nm or more and 50 nm or less.

In a case where a surface state of a part between a first thin wire 13 and a second thin wire 14 is hydrophilic, the interfacial tension between the thin wires or with an insulating film 15 formed between the thin wires is lowered, as a result of which a water droplet is easily spread, and therefore, the thin wires are connected to each other with a small amount of water droplets, and a galvanic current easily flows. Further, in a case where there is an enough amount of water droplets to be detected by a conventional galvanic current detection-type dryness/wetness responsive sensor, by making the surface state hydrophilic, a water droplet is further spread, as a result of which multiple thin wires are covered with the water droplet, and correspondingly, the galvanic current is increased, and the detection sensitivity is improved.

In a case where a surface state of a part between a first thin wire 13 and a second thin wire 14 is hydrophobic, the interfacial tension between the thin wires or with an insulating film 15 formed between the thin wires is increased, as a result of which a water droplet is in an isotropic shape similar to a hemisphere or sphere, and therefore, the correlation between the amount of water droplets and the size (diameter) of water droplets is increased, and the determination accuracy of the amount of water droplets is improved. The improvement of the determination accuracy is directly linked to the improvement of the detection accuracy. In a case where the determination accuracy is high, by narrowing the spacing "d" between the first thin wire 13 and the second thin wire 14, improvement in both of the detection sensitivity and the detection accuracy can be achieved.

The hydrophilicity or hydrophobicity of the surface state of a part between a first thin wire 13 and a second thin wire 14 can be quantified by a contact angle of water (pure water).

The contact angle of water in a part between the first thin wire 13 and the second thin wire 14, and the contact angle of water of the insulating film 15 formed between the first thin wire 13 and second thin wire 14 are required to be 0° or more and 30° or less, and more preferably 0° or more and 15° or less in a case of the hydrophilicity, and 60° or more and 180° or less, and more preferably 65° or more and 180° or less in a case of the hydrophobicity.

In a case where the contact angle of water is 0° or more and 30° or less, a small amount of water droplets generated on a sensor spreads sufficiently, and the detection sensitivity is improved. In particular, in a case where the contact angle of water is 0° or more and 15° or less, the water droplets spread sufficiently, and the detection sensitivity is improved.

In a case where the contact angle of water is 60° or more and 180° or less, in the small amount of water droplets generated on a sensor, a water droplet is in an isotropic shape highly similar to a sphere in a plan view, and therefore, the correlation between the amount of water droplets and the size of water droplets is increased, and the determination accuracy of the amount of water droplets is improved. In particular, in a case where the contact angle of water is 65° or more and 180° or less, the shape of the water droplets becomes more isotropic, and the determination accuracy of the amount of water droplets is increased and the detection accuracy is improved.

In the dryness/wetness responsive sensor according to the present invention, a water droplet generated between a first thin wire and a second thin wire is detected, and the state of dryness/wetness is detected. The size of a water droplet is linked to the state of dryness/wetness, and therefore, the spacing "d" between the first thin wire 13 and the second thin wire 14 is important for the dryness/wetness responsive sensor. If the spacing "d" is narrow, an extremely fine water droplet generated in a state closer to drying can be detected, and if the spacing "d" is wide, a relatively large water droplet generated in a state of high humidity can be detected.

Further, in a case of performing the detection of a water droplet, for example, in a case where a state of generation of water vapor, fog, or dew condensation is monitored, or a corrosion environment involving water is monitored, the dryness/wetness responsive sensor according to the present invention can be used as a sensor that can detect a water droplet having a desired size by setting the spacing "d".

In the dryness/wetness responsive sensor according to the present invention, by utilizing a technique of a semiconductor manufacturing process, the spacing "d" between thin wires can be reduced to the extent of 5 nm. Further, there is no particular upper limitation on the distance between thin wires, however, by setting the spacing "d" between the thin wires to be less than 20 μm, the humidity can be suitably monitored.

As the spacing "d" between thin wires is decreased, conductive fine particles such as metal powders present in the air and the like are attached between the thin wires, and accordingly, a possibility of forming a short circuit increases. Regarding this problem, by setting up a countermeasure as below, the occurrence of the problem can be prevented.

(1) By arranging a meshed body on the front face of the thin wires, fine particles do not arrive at the thin wires.
(2) An insulating protection film of a silicon oxide or the like, which has fine openings exposing at least a part of each thin wire, is arranged on the front face of the thin wires. With this configuring, even when conductive fine particles are attached near the entrance of the fine opening portion of the insulating protection film, the fine openings prevent the particles from directly contacting the thin wires and causing a short circuit, since the thin wires are positioned deep in the opening by the thickness of the insulating protection film.
(3) An approach from the aspect of the sensor system can be employed in which, for example, though a dryness/wetness responsive sensor itself having a usual structure is used, a plurality of such sensors are arranged closely to each other, and the sensors in which a short circuit between a cathode electrode and a anode electrode is detected or from which no output current is detected while output currents are detected from other sensors is excluded from the measurement system (electrically disconnected, the measured value of the output current not used with the electric connection unchanged, etc.).

Examples

Hereinafter, as the example, a total of two dryness/wetness responsive sensors, that is, a dryness/wetness responsive sensor in which a first thin wire and a second thin wire are arranged in a comb shape, and a hydrophilic insulating film is formed between the thin wires, and a dryness/wetness responsive sensor in which a first thin wire and a second thin wire are arranged in a comb shape, and a hydrophobic insulating film is formed between the thin wires, are prepared, and evaluation of the characteristics is described. It is understood that the present invention is not limited to such specific embodiments, and it should be noted that the technical scope of the present invention is defined by claims.

Figure 3:
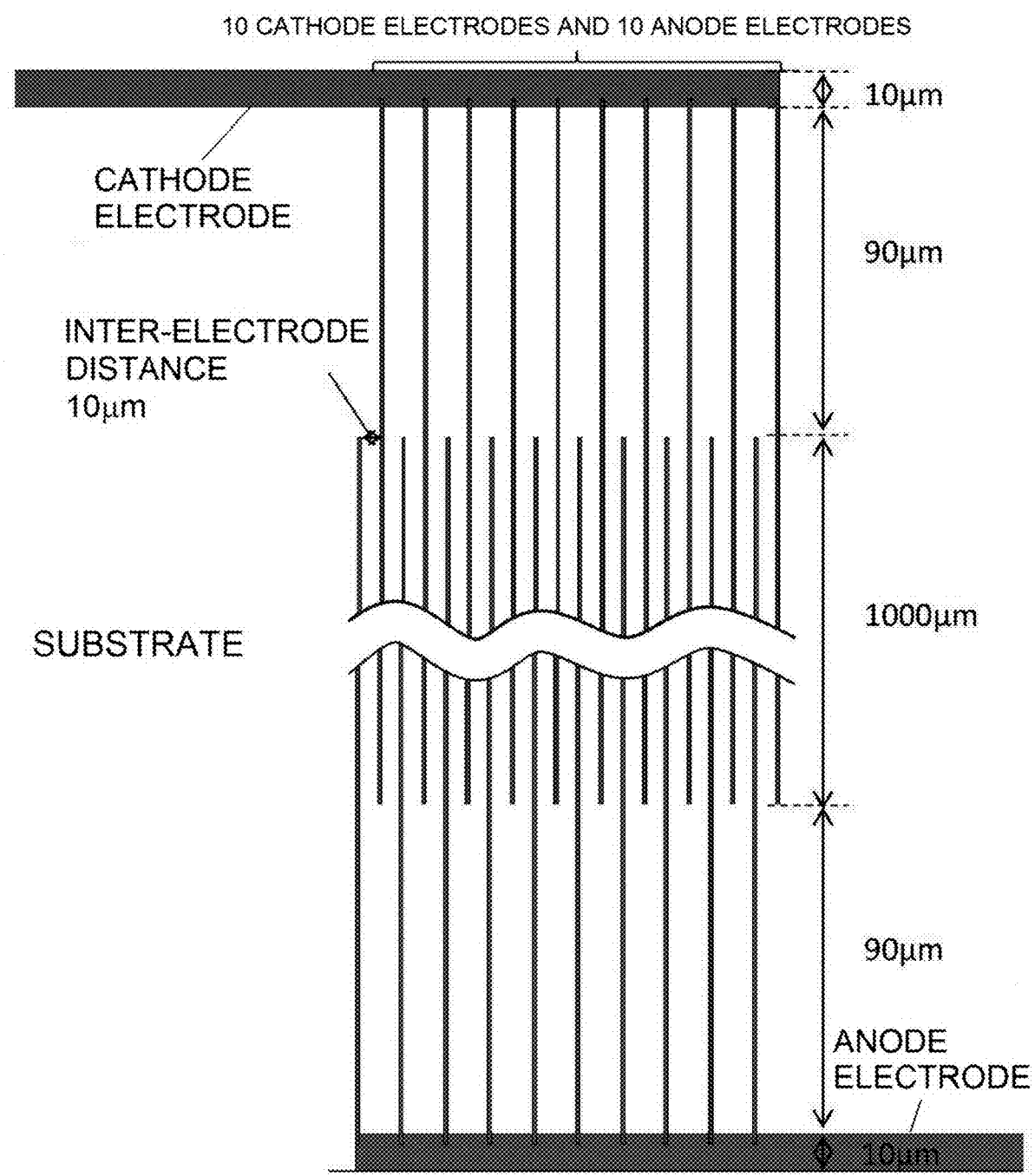
FIG. 3 is a plan view that illustrates an example of electrode arrangement of a dryness/wetness responsive sensor.

As illustrated in FIG. 3, a dryness/wetness responsive sensor in which a cathode electrode made of gold (Au) as a first thin wire and an anode electrode made of copper (Cu) as a second thin wire were arranged in a comb shape on a silicon wafer substrate with a silicon oxide film, and an insulating film was formed between the first thin wire and the second thin wire was produced. The heights of the first thin wire, the second thin wire, and the insulating film (heights from the substrate to respective upper surfaces) were made uniform. As such, a first dryness/wetness responsive sensor using a hydrophilic insulating film, and a second dryness/wetness responsive sensor using a hydrophobic insulating film were produced. In this regard, GL2000 (manufactured by Gluon Lab) was used as the hydrophilic insulating film, and PMMA was used as the hydrophobic insulating film.

In the cathode electrode and the anode electrode illustrated in FIG. 3, while a side close to a signal lead terminal (not illustrated in the drawing) of the dryness/wetness responsive sensor for the outside is unified as one to be a concentrated portion (the upper and lower sides in FIG. 3 are denoted by thick lines running in the horizontal direction), the concentrated portion branches into a plurality of parts near each terminal end portion. In the embodiment illustrated in FIG. 3, ten branches of each electrode are disposed. The branching cathode electrodes and the branching anode electrodes extend in a parallel direction (more specifically, an antiparallel direction; hereinafter, simply referred to as a parallel direction) and, for most of the extended distance, are arranged in the parallel direction and approached each other.

In this embodiment, the concentrated portions of the cathode electrode and the anode electrode extend in the antiparallel direction with being separate by 1180 µm, and each branching portion extends by 1090 µm toward an opposing concentrated portion. Each thin wire of the branching portion is arranged in parallel to the thin wire of the extended portion of the opposite side over 1000 µm except for 90 µm of the root portion. The spacing (a separation distance between the branching thin wire of the cathode electrode and the branching thin wire of the anode electrode) between both the electrodes of this approached portion was 10 µm. In this embodiment, ten branching thin wires of the cathode electrode and ten branching thin wires of the anode electrode were arranged so as to be approached over 1000 µm. Since there are 19 parallel approached sites (gaps between the branching thin wires of the cathode electrode and the anode electrode) between the branching thin wires, a total approaching distance is 1000 µm×19=19 mm.

Next, a method for producing the dryness/wetness responsive sensor 101 will be described with reference to FIGS. 4(a) to 4(i).

Figure 4:
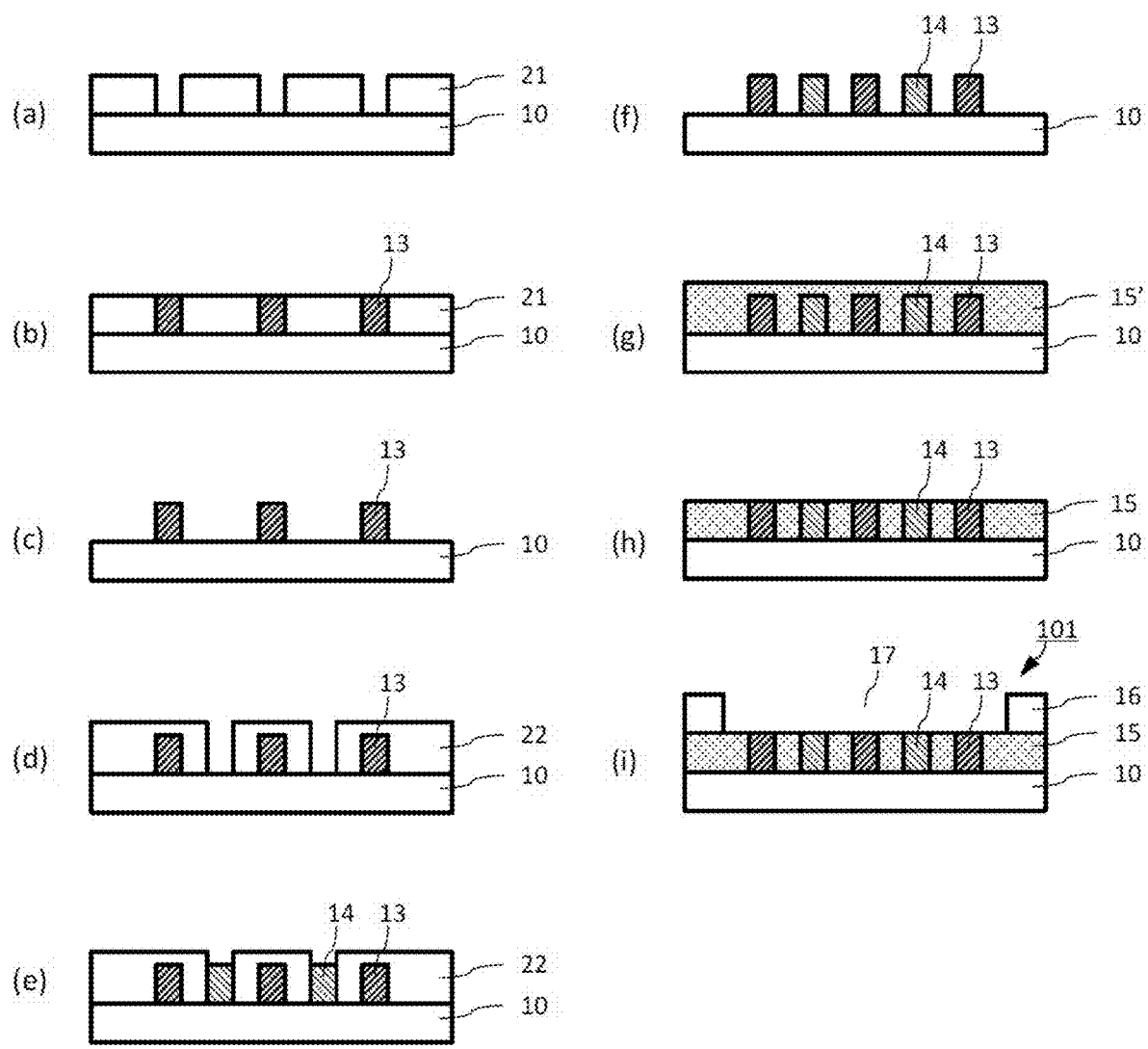
FIGS. 4(a) to 4(i) are sectional views of a main part, for illustrating a manufacturing process of a dryness/wetness responsive sensor.

First, as illustrated in FIG. 4(a), a silicon substrate with a silicon oxide film on its surface was prepared as an insulating substrate 10, and a first resist film 21 for forming a first thin wire 13 and a first electrode (not illustrated in FIGS. 4(a) to 4(i), but illustrated as "11" in FIG. 1(a)) was formed on the silicon substrate by lithography.

Next, titanium (Ti) was deposited as an adhesion layer by 10 nm, and further gold (Au) was deposited by a thickness of 150 nm (FIG. 4(b)). Further, the first resist film 21 was peeled off with a solvent, and a first thin wire 13 serving as a cathode electrode was formed by a so-called lift-off method (FIG. 4(c)). In this regard, although not illustrated in FIGS. 4(a) to 4(i), a first electrode 11 was also formed at the same time.

Then, a second resist film 22 for forming a second thin wire 14 and a second electrode (not illustrated in FIGS. 4(a) to 4(i), but illustrated as "12" in FIG. 1(a)) was formed by lithography (FIG. 4(d)), and next, titanium (Ti) was deposited as an adhesion layer by 10 nm, and further copper (Cu) was deposited by a thickness of 150 nm (FIG. 4(e)). Further, the second resist film 22 was peeled off with a solvent, and a second thin wire 14 serving as an anode electrode was formed (FIG. 4(f)). In this regard, although not illustrated in FIGS. 4(a) to 4(i), a second electrode 12 was also formed at the same time.

Next, as illustrated in FIG. 4(g), an insulating film 15' was coated, and then etchback by ashing was performed to form an insulating film 15 (FIG. 4(h)). In this regard, the first thin wire 13, the second thin wire 14, and the insulating film 15 were of uniform height. As the insulating film 15, hydrophilic GL2000 (manufactured by Gluon Lab) and hydrophobic PMMA was used in a first sample and a second sample, respectively. In a case where the hydrophilic GL2000 had been used, heat treatment was not performed after coating the insulating film 15. In a case where the hydrophobic PMMA had been used, heat treatment was performed at 140° C. for 120 minutes in an oven after coating the insulating film 15.

Then, a protective film 16 having an opening 17 was formed in a dryness/wetness sensing part, and a dryness/wetness responsive sensor 101 was produced (FIG. 4(i)).

Next, it was examined how the state of liquid droplets changes between the case of using a hydrophilic insulating film and the case of using a hydrophobic insulating film.

Figure 5:
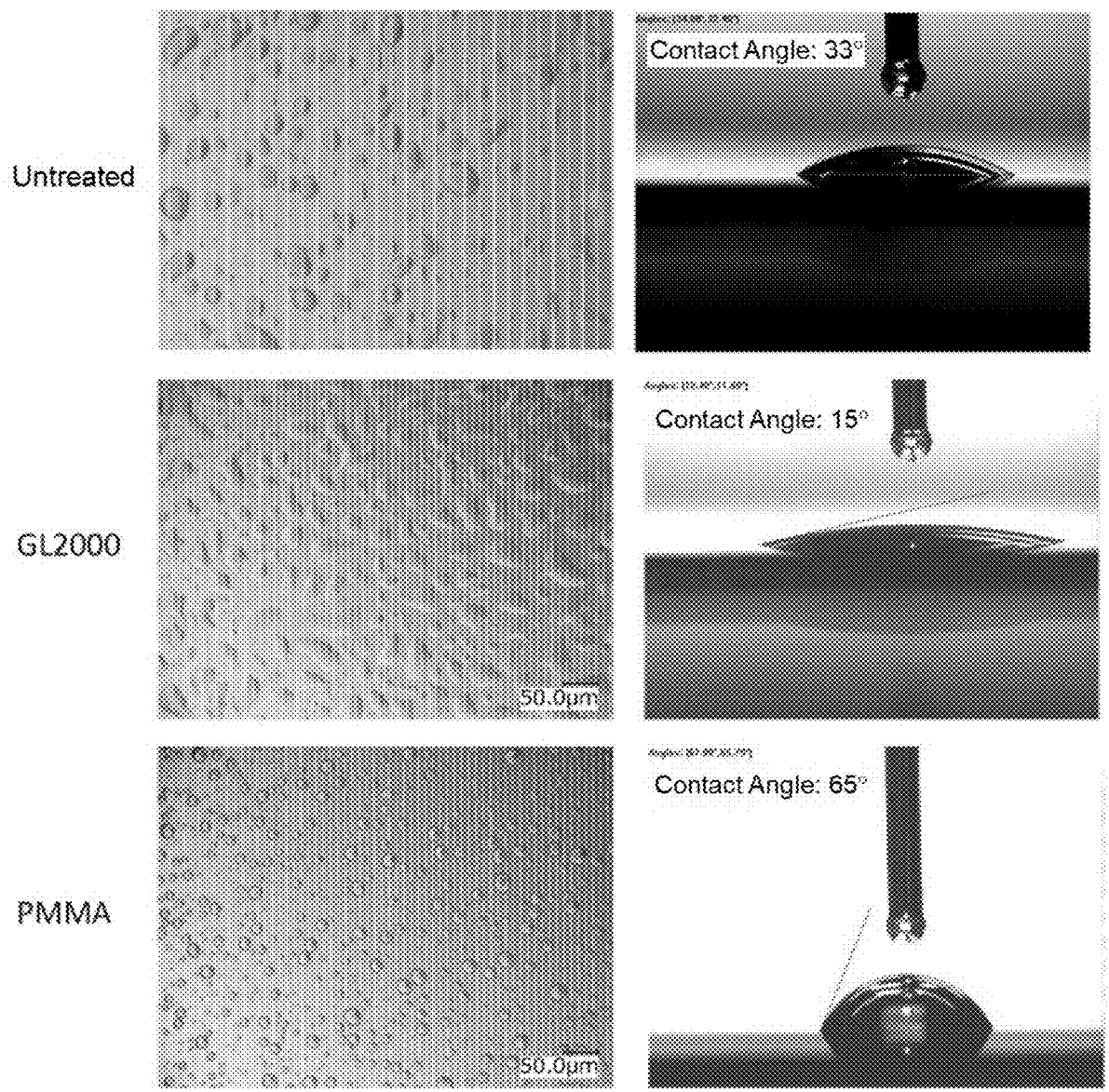
FIG. 5 presents photographs that show water droplets on a surface of a dryness/wetness responsive sensor when pure water is sprayed, and show states of contact angle measurement of water.

With respect to each sample, a photograph on the left side of FIG. 5 was taken by observing from the upper side of a sensing part of the dryness/wetness responsive sensor, and shows a state of water droplets formed when pure water in a fog state was sprayed with a sprayer on the sensing part. In FIG. 5, as a comparative example, the result of a state in which no insulating film has been formed in a part between first and second thin wires is also shown with the title "untreated". That is, the "untreated" represents a case where the part between the first and second thin wires is a space as illustrated in FIG. 2, and no surface treatment has been performed on an insulating substrate 10, the first thin wire 13, and the second thin wire 14.

From these photographs, it can be found that the water droplets each have an indefinite shape but a spread shape in a case where the hydrophilic GL2000 has been used as the insulating film, the water droplets each have a circular shape having a small particle size in a case where the hydrophobic PMMA has been used as the insulating film, and the water droplets each have an intermediate state between the above two cases in the untreated case.

In order to quantify the degrees of the hydrophilicity and the hydrophobicity of an insulating film, the contact angle of a water droplet to be formed was measured by using each solid film. That is, pure water was dropped on each of the films of GL2000 and PMMA to form a water droplet on each of the films, and the contact angle of the water droplet was measured. In the "untreated" case, the contact angle of a water droplet formed on a silicon oxide film on a surface of a silicon substrate used as a substrate was measured. The amount of the water dropped was 1 µL, and the contact angle of the water droplet was measured under the conditions of a temperature of 25° C. and a relative humidity of 50%.

The results are shown as photographs on the right side of FIG. 5. The contact angles of water of the untreated case, the GL2000 case, and the PMMA case were 33°, 15°, and 65°, respectively.

Next, water was sprayed to the dryness/wetness responsive sensor, and response signal characteristics were examined when water droplets were formed. Water was sprayed five times every 120 seconds, and a current flowing between a first electrode 11 and a second electrode 12 was measured with a minute current measuring instrument (manufactured by QUEST7). In the measurement environment at that time, the temperature was room temperature (23° C.), and the relative humidity was 40%.

Figure 6:
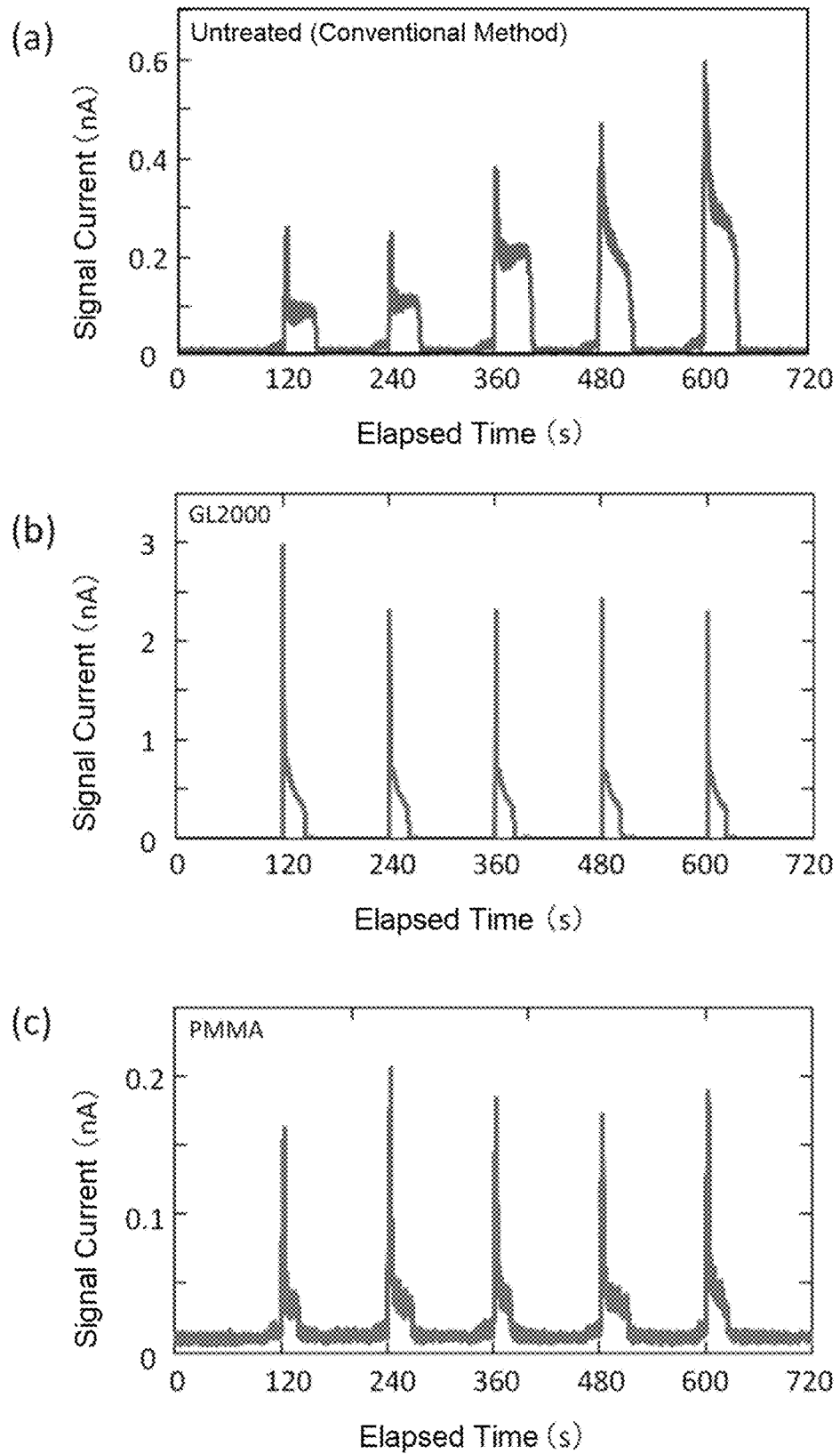
FIGS. 6(a) to 6(c) are characteristic diagrams that illustrate response signals of a dryness/wetness responsive sensor.

As can be understood from FIGS. 6(a) to 6(c) illustrating the results, after a peak current in an extremely short time flowed sharply with the start of spraying, a steady-state current region of around 20 seconds appeared, and then the signal waveform was settled to the background level in a cut-off manner.

The peak current values and steady-state current values of the signals are shown in Table 1. When GL2000 being a hydrophilic insulating film was used, a significantly large current value was obtained in each of the peak current and the steady-state current, and thus, it was demonstrated that a high detection current is obtained by making a part between a first thin wire and a second thin wire hydrophilic. In this regard, as the steady-state current value, a current value 10 seconds after the start of spraying was used.

TABLE 1

| State between Thin Wires (Insulating Film) | Peak Current Value (nA) | Steady-state Current Value (nA) |
|---|---|---|
| Untreated | 0.38 | 0.23 |
| GL2000 | 2.0 | 0.3~0.6 |
| PMMA | 0.2 | 0.02~0.05 |

Figure 7:
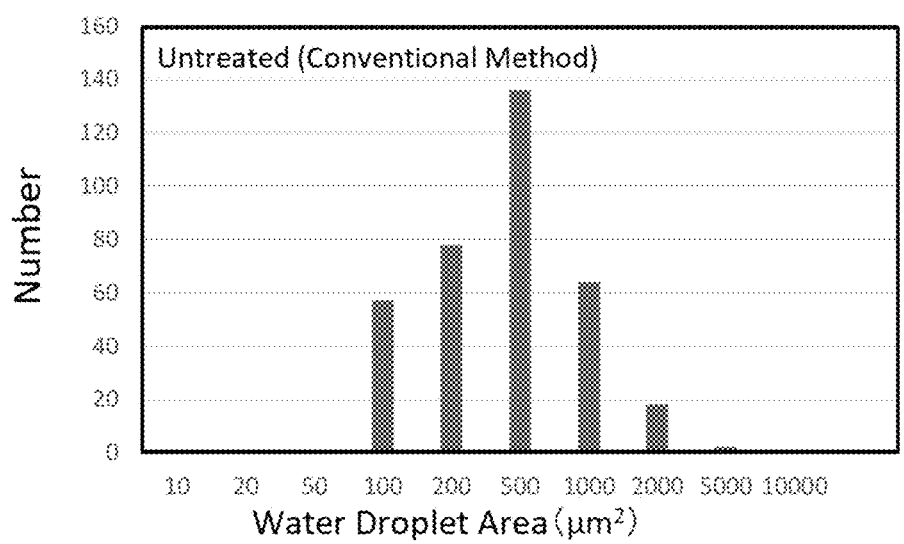
FIGS. 7(a) to 7(c) are characteristic diagrams that illustrate distribution of size of water droplets on a surface of a dryness/wetness responsive sensor.
Figure 7:
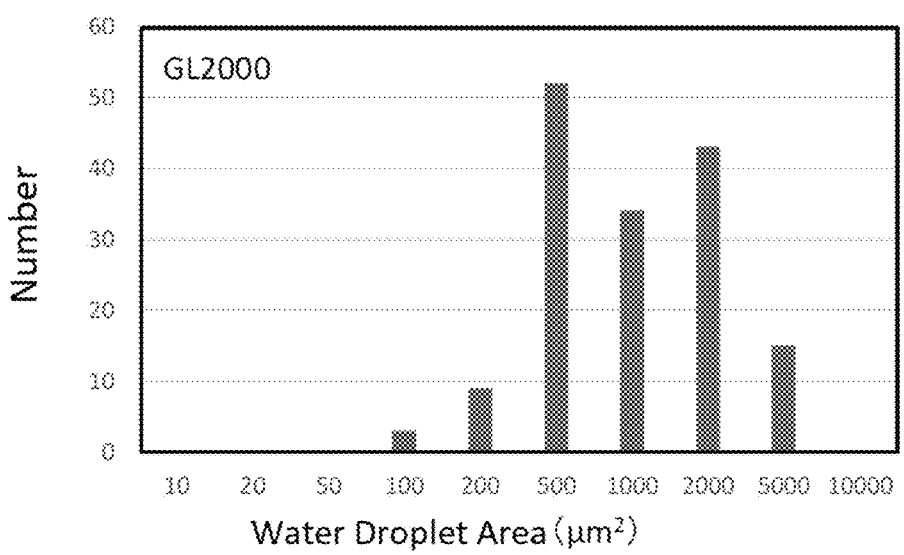
Figure 7:
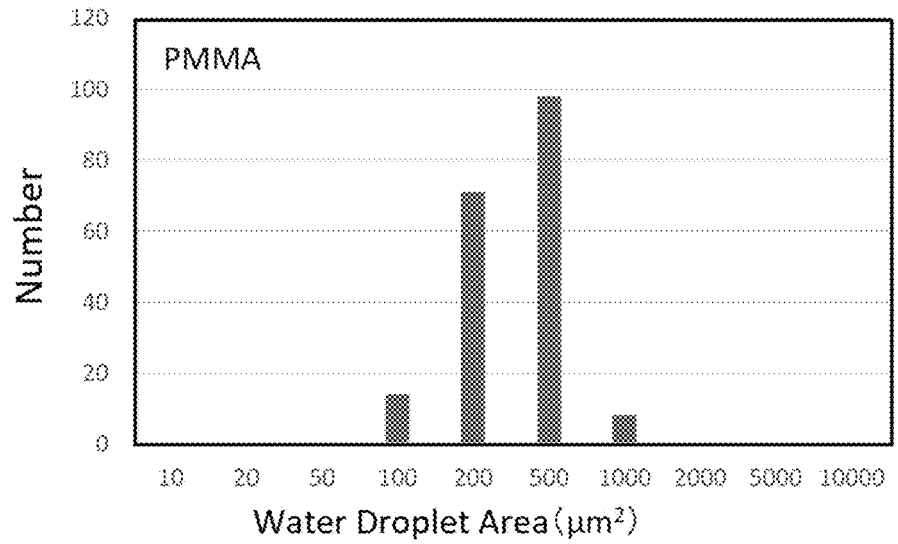
Figure 8:
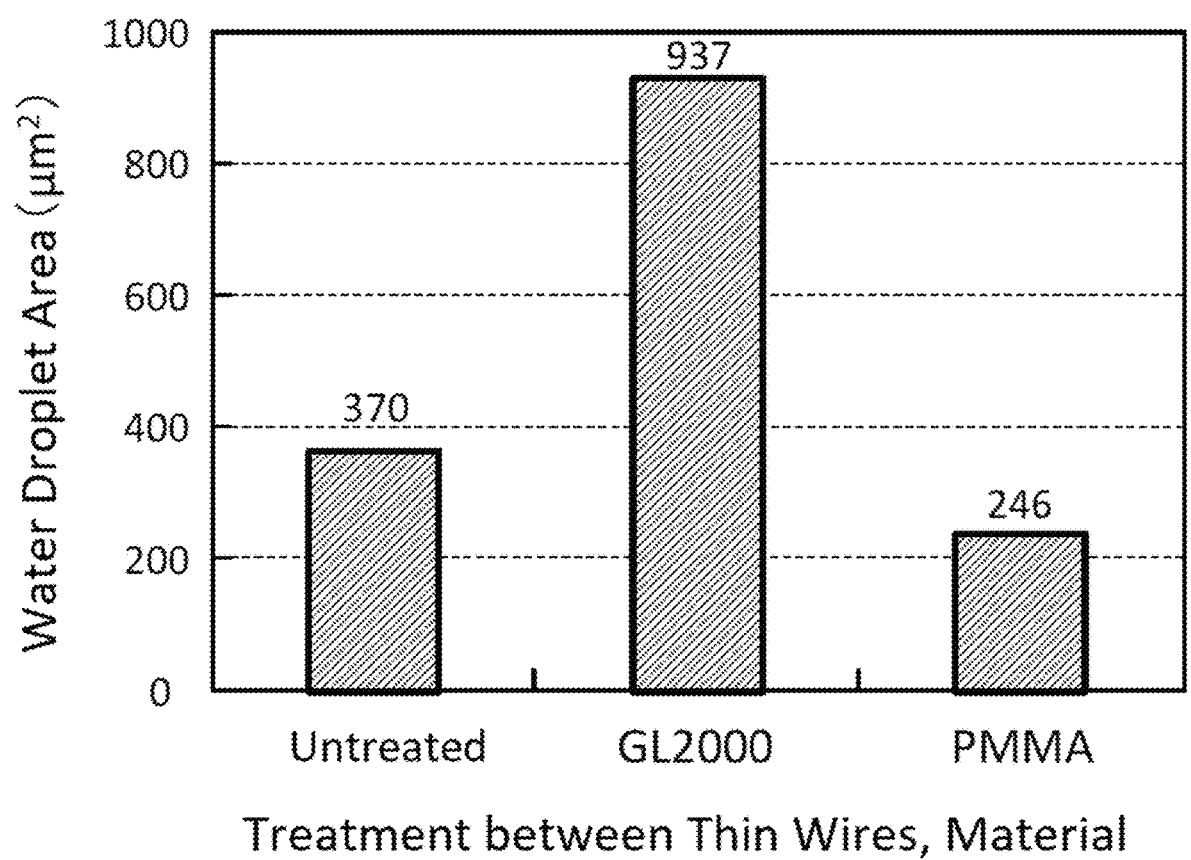
FIG. 8 is a characteristic diagram that illustrates size of water droplets on a surface of a dryness/wetness responsive sensor.
Figure 9:
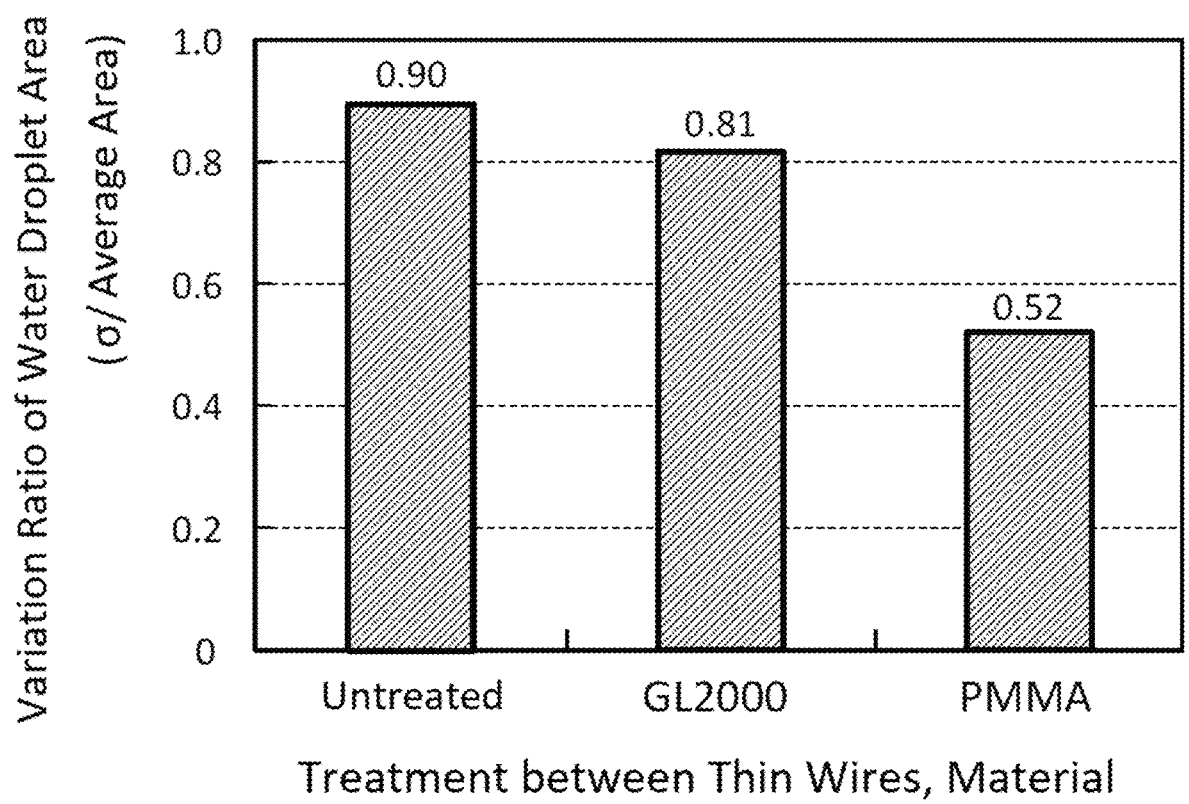
FIG. 9 is a characteristic diagram that illustrates variation of size of water droplets on a surface of a dryness/wetness responsive sensor.

Next, the size distribution of the water droplets formed on a sensing part of the dryness/wetness responsive sensor was examined when pure water was sprayed in the form of a fog. The results are illustrated in FIGS. 7(a) to 7(c). Further, on the basis of the number distribution with respect to the water droplet area illustrated in FIGS. 7(a) to 7(c), the variation ratio of the average water droplet area and the water droplet area were calculated, and the results are illustrated in FIGS. 8 and 9, respectively. In this regard, as the variation ratio of the water droplet area, a value obtained by dividing the standard deviation "6" of the water droplet area variation by the average area of the water droplets was used.

It was quantitatively confirmed that the average area of the water droplets formed on a sample on which GL2000 being a hydrophilic insulating film had been formed in a part between first thin wire and second thin wire was as large as 937 $\mu m^2$, that is, around 2.5 times larger than the average area (370 $\mu m^2$) in the untreated case where the state of water in a part between the thin wires had not been controlled (FIG. 8). In addition, the average area of water droplets in a case where hydrophobic PMMA was used as the insulating film was 246 $\mu m^2$, and was decreased to around ⅔ of the average area in the untreated case.

On the other hand, as illustrated in FIG. 9, the variation ratio of the water droplet area was 0.90 in the untreated case, 0.81 in the case of using GL2000, and 0.52 in the case of using PMMA. It was confirmed that by making the state in a part between first thin wire and second thin wire hydrophobic with the use of PMMA, the variation in the distribution (variation ratio) of the water droplet area was largely reduced to around half the variation in the distribution of the untreated case, and the controllability of the size of a liquid droplet was largely improved. Further, it was also confirmed that even in a case where the state in a part between first thin wire and second thin wire had been made hydrophilic with the use of GL2000, the variation in the distribution of the water droplet area was reduced as compared with the variation in the distribution of the untreated case, and the controllability of the size of a liquid droplet was slightly improved.

Figure 10:
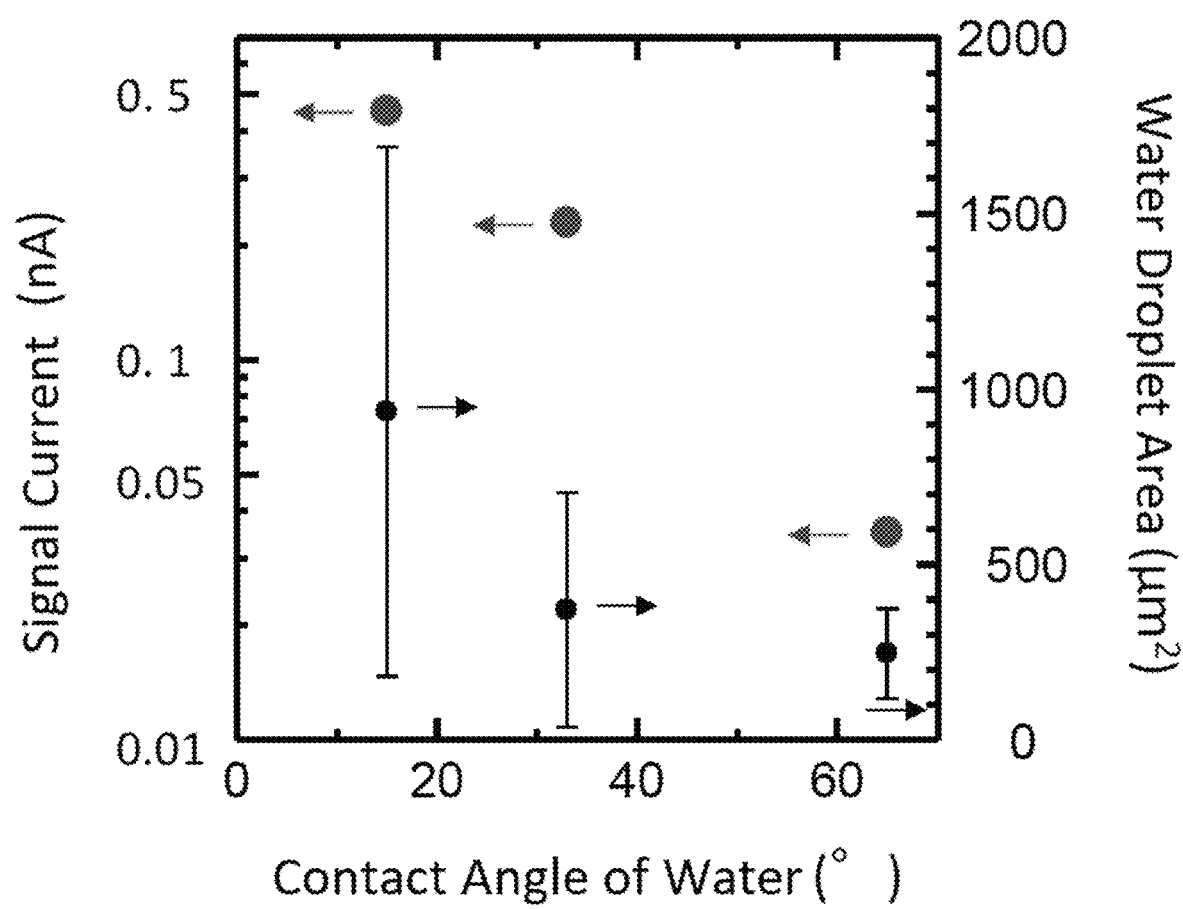
FIG. 10 is a characteristic diagram that illustrates a state that the magnitude of a signal current and the size of a water droplet both depend on the contact angle of water.

On the basis of the above data, the signal current, the area of a water droplet, and the variation in the area of a water droplet were summarized into one graph with the use of the contact angle of water as a parameter, and the result was illustrated in FIG. 10. In this regard, the variation ratio of the water droplet area was indicated by an error bar, and as the signal current, a steady-state current value was used.

When the contact angle of water is reduced to 15°, an effect that the area of a water droplet is increased, and accordingly the signal current is also increased can be obtained. On the other hand, when the contact angle of water is increased to 65°, an effect that the area of a water droplet is reduced, and accordingly the signal current is also reduced, but the variation in the water droplet area is largely reduced can be obtained.

INDUSTRIAL APPLICABILITY

According to the present invention, a small-sized dryness/wetness responsive sensor having a simple structure, which does not necessarily require a sensor driving power and responds quickly with a high sensitivity, is provided. Further, the dryness/wetness responsive sensor can also be used as a water droplet detection sensor having the above characteristics.

The dryness/wetness responsive sensor and the water droplet detection sensor have various applications to, for example, environmental control, grasping and controlling of indoor dew condensation or window fogging, and monitoring of corrosion environment of a bridge or the like. The sensor of the present invention, which is small in size, has a high sensitivity, and has a low driving power, is expected to be used in various scenes.

REFERENCE SIGNS LIST

10: Insulating substrate
11: First electrode
12: Second electrode
13: First thin wire
14: Second thin wire
15: Insulating film
16: Protective film
17: Opening
21: First resist film
22: Second resist film
101: Dryness/wetness responsive sensor

The invention claimed is:

1. A dryness/wetness responsive sensor comprising
    a thin wire of a first metal,
    a thin wire of a second metal, the second metal being different from the first metal,
    wherein the thin wire of the first metal and the thin wire of the second metal are disposed in juxtaposition with each other on an insulating substrate,
    wherein an insulating film is formed in a whole part between the thin wire of the first metal and the thin wire of the second metal, and
    wherein the insulating film is hydrophilic or hydrophobic.

2. The dryness/wetness responsive sensor according to claim 1, wherein the thin wire of the first metal, the thin wire of the second metal, and the insulating film are formed on the insulating substrate, and wherein the thin wire of the first metal, the thin wire of the second metal, and the insulating film are of uniform height.

3. The dryness/wetness responsive sensor according to claim 1, wherein a contact angle of water on a surface of the insulating film is 0° or more and 30° or less.

4. The dryness/wetness responsive sensor according to claim 1, wherein a contact angle of water on a surface of the insulating film is 0° or more and 15° or less.

5. The dryness/wetness responsive sensor according to claim 1, wherein a contact angle of water on a surface of the insulating film is 60° or more and 180° or less.

6. The dryness/wetness responsive sensor according to claim 1, wherein a contact angle of water on a surface of the insulating film is 65° or more and 180° or less.

7. The dryness/wetness responsive sensor according to claim 1, wherein the first metal is selected from a group consisting of gold, platinum, silver, titanium, an alloy thereof, and carbon.

8. The dryness/wetness responsive sensor according to claim 1, wherein the second metal is selected from a group consisting of silver, copper, iron, zinc, nickel, cobalt, aluminum, tin, chromium, molybdenum, manganese, magnesium, and an alloy thereof.

9. The dryness/wetness responsive sensor according to claim 1, wherein the spacing between the thin wire of the first metal and the thin wire of the second metal is in a range of 5 nm or more and 20000 nm or less.

10. The dryness/wetness responsive sensor according to claim 1,
comprising a plurality of at least one selected from the group consisting of the thin wire of the first metal and the thin wire of the second metal,
wherein the thin wire of the first metal extends from a first side towards a second side that is opposite to the first side and the thin wire of the second metal extends from the second side towards the first side such that the thin wire of the first metal and the thin wire of the second metal are arranged in parallel with and approached each other.

* * * * *